(12) United States Patent
Wijnands et al.

(10) Patent No.: US 8,107,473 B2
(45) Date of Patent: Jan. 31, 2012

(54) AUTOMATION FALLBACK TO P2P LSPS FOR MLDP BUILT MULTIPOINT-TREES

(75) Inventors: Ijsbrand Wijnands, Leuven (BE); Arjen Boers, Sitges (ES); John S. Meylor, Auburn, CA (US)

(73) Assignee: Cisco Technology, Inc., San Jose, CA (US)

( * ) Notice: Subject to any disclaimer, the term of this patent is extended or adjusted under 35 U.S.C. 154(b) by 435 days.

(21) Appl. No.: 11/377,063

(22) Filed: Mar. 16, 2006

(65) Prior Publication Data
US 2007/0217428 A1 Sep. 20, 2007

(51) Int. Cl.
*H04L 12/28* (2006.01)
*H04L 12/56* (2006.01)

(52) U.S. Cl. ........ 370/392; 370/390; 370/391; 370/401; 370/432

(58) Field of Classification Search .................. 370/390, 370/401, 432
See application file for complete search history.

(56) References Cited

U.S. PATENT DOCUMENTS

| | | | |
|---|---|---|---|
| 6,374,303 B1 | 4/2002 | Armitage et al. | 709/242 |
| 6,778,531 B1 | 8/2004 | Kodialam et al. | 370/390 |
| 6,947,428 B1 * | 9/2005 | Andersson et al. | 370/395.5 |
| 7,061,921 B1 | 6/2006 | Sheth | 370/395.52 |
| 7,260,097 B2 * | 8/2007 | Casey | 370/392 |
| 7,281,058 B1 * | 10/2007 | Shepherd et al. | 709/238 |
| 7,558,219 B1 | 7/2009 | Aggarwal et al. | 370/256 |
| 2002/0067724 A1 | 6/2002 | Helm et al. | 370/390 |
| 2003/0005074 A1 | 1/2003 | Hertz et al. | 709/216 |
| 2003/0058857 A1 | 3/2003 | Maher et al. | 370/390 |
| 2003/0131228 A1 | 7/2003 | Twomey | 713/153 |
| 2003/0133412 A1 | 7/2003 | Iyer et al. | 370/235 |
| 2003/0142669 A1 * | 7/2003 | Kubota et al. | 370/389 |
| 2004/0125803 A1 | 7/2004 | Sangroniz et al. | 370/390 |
| 2004/0233907 A1 | 11/2004 | Hundscheidt et al. | 370/390 |

(Continued)

OTHER PUBLICATIONS

International Searching Authority; Notification of Transmittal of the International Search Report and the Written Opinion of the International Searching Authority, or the Declaration, International Application No., PCT/US2006/042408; Date of Mailing: Jan. 29, 2008; pp. 1-4.

(Continued)

*Primary Examiner* — Hassan Phillips
*Assistant Examiner* — Lonnie Sweet
(74) *Attorney, Agent, or Firm* — Campbell Stephenson LLP

(57) ABSTRACT

A method of using a point-to-point (P2P) label switched path (LSP) to transmit multicast data packets partially through a multiprotocol label switched (MPLS) network when one or more label switched routers (LSRs) of the MPLS are not multicast label distribution protocol (mLDP) enabled. The P2P LSP can be used to transmit multicast data packets to the head end of a point-to-multipoint (P2MP) LSP created with mLDP enabled LSRs. The P2MP LSP can be used to transmit the multicast data packets through the MPLS network to intended receivers that are external to the MPLS network. When configuring the P2MP LSP, an mLDP enabled LSR receives a first message from a non-mLDP enabled MPLS core router in response to sending a label mapping message to the non-mLDP enabled MPLS core router. In response, a directed LDP session is created between the mLDP enabled LSR and an edge LSR in one embodiment in response to receiving the first message from an MPLS enabled core router. The directed LDP session can be used to transmit a label mapping message to an ingress LSR.

19 Claims, 7 Drawing Sheets

U.S. PATENT DOCUMENTS

| | | | | |
|---|---|---|---|---|
| 2005/0076143 | A1 | 4/2005 | Wang et al. | 709/245 |
| 2005/0169266 | A1* | 8/2005 | Aggarwal et al. | 370/389 |
| 2005/0169270 | A1* | 8/2005 | Mutou et al. | 370/390 |
| 2006/0007931 | A1* | 1/2006 | Wright et al. | 370/392 |
| 2006/0029001 | A1 | 2/2006 | Mensch et al. | 370/254 |
| 2006/0039364 | A1* | 2/2006 | Wright | 370/352 |
| 2006/0062218 | A1* | 3/2006 | Sasagawa | 370/389 |
| 2006/0147204 | A1* | 7/2006 | Yasukawa et al. | 398/26 |
| 2006/0159009 | A1* | 7/2006 | Kim et al. | 370/216 |
| 2006/0182105 | A1* | 8/2006 | Kim et al. | 370/389 |
| 2006/0221958 | A1 | 10/2006 | Wijnands et al. | 370/389 |
| 2006/0221975 | A1* | 10/2006 | Lo et al. | 370/395.5 |
| 2007/0058646 | A1* | 3/2007 | Hermoni | 370/401 |
| 2007/0104194 | A1* | 5/2007 | Wijnands et al. | 370/390 |
| 2007/0140107 | A1 | 6/2007 | Eckert et al. | 370/216 |
| 2007/0195778 | A1* | 8/2007 | Tatar et al. | 370/392 |
| 2007/0263634 | A1 | 11/2007 | Reeves et al. | 370/395.2 |
| 2008/0175240 | A1 | 7/2008 | Suzuki | 370/390 |
| 2008/0253379 | A1 | 10/2008 | Sasagawa | 370/395.5 |

OTHER PUBLICATIONS

Ooms, D., et al. "MPLS Multicast Traffic Engineering," Feb. 2002, pp. 1-13.

Pan, Ping, et al., "Pseudo Wire Protection," Network Working Group, Internet Draft; Jul. 2005; pp. 1-15.

Andersson, Loa et al., "LDP Specification," Network Working Group, Internet Draft Oct. 2005; pp. 1-135.

Aggaral et al., "PIM-SM Extensions for Supporting Remote Neighbors," Network Working Group, Internet Draft, Jul. 2004, pp. 1-7.

Minei, I. et al, "Label Distribution Protocol Extensions for Point-to-Point Multipoint Label Switched Paths," Jul. 17, 2005, pp. 1-15.

D. Ooms, et al., "Framework for IP Multicast in MPLS," Internet Draft, Submitted to MPLS Working Group, May 1999, pp. 1-29 & Figures 1 & 2.

Rosen, E., et al., "Multiprotocol Label Switching Architecture," Request for Comments 3031, Jan. 2001, pp. 1-24.

Seisho Yasukawa, et al., "BGP/MPLS IP Multicast VPNs," Networking Working Group, IETF Internet Draft, Feb. 2005, pp. 1-24.

Ijsbrand Wijnands, et al., "Multicast Extension for LDP," Network Working Group, Internet Draft, Mar. 2005, pp. 1-12.

Gao, Yuan, "RMCM: Reliable Multicasts for Core-Based Multicast Trees," Nov. 14, 2000, IEEE, Intl. Conf. on Network Protocols, 2000; Proceedings, pp. 83-94.

Yang, Baijian et al., Multicasting in MPLS Domains, Computer Communications, Elsevier Science Publishers B.V., Available at www.computerscienceweb.com; Computer Communications 27 (2004), pp. 162-170.

* cited by examiner

AUTOMATION FALLBACK TO P2P LSPS FOR MLDP BUILT MULTIPOINT-TREES

CROSS-REFERENCE TO RELATED APPLICATIONS

The present patent application claims priority to U.S. patent application Ser. No. 11/267,674 filed Nov. 4, 2005, entitled "In-Band Multicast Signaling Using LDP." This application is incorporated by reference herein in its entirety.

BACKGROUND OF THE INVENTION

Businesses employ networks to interconnect their computers, servers, storage devices, and other network elements. As a business grows, so can its network, increasing the number of network elements coupled to the network, the number of network links, and also geographic diversity. A business' network elements can be scattered throughout a city, a state, a country, or the world. Since it can be prohibitively expensive to create a private network that spans great distances, many businesses opt to rely upon a third-party provider's network to provide connectivity between network elements at disparate geographic sites. In order for the business' network to seamlessly function through the provider's network, the provider's network must be able to provide a medium for transmission of various types of data-streams, including multicast data-stream transmission.

Multicast enables simultaneous transmission of data packets between a source and select receivers (i.e., those receivers belonging to a multicast group identified by a multicast group IP address). In packet-switched networks, multicast data packets are forwarded to receivers of a group through a multicast distribution tree that consists of number of network nodes. The nodes in a packet-switched network forward multicast data packets based on information (e.g., the source and/or group IP addresses) contained in the packets. For purposes of explanation only, the term node will mean a router or a device that functions as a router, it being understood that the term node should not be limited thereto. Routers of the tree are responsible for replicating multicast data packets at each bifurcation point (the point of the tree where branches fork). This means that only one copy of the multicast data packets travel over any particular link in the network, making multicast distribution trees extremely efficient for distributing the same information to many receivers.

Multiprotocol Label Switching (MPLS) is one network technology often employed by provider networks. In operation, ingress edge label switch routers (LSRs) of MPLS networks assign labels to incoming data packets. Labels are short, fixed length, locally significant identifiers which are used to identify a Forwarding Equivalence Class (FEC). Packets that share the same requirement for transport across an MPLS network share the same FEC. Thus, packets belonging to the same FEC (e.g., multicast data packets with the same source and group IP addresses) will generally follow the same path through the MPLS network. When assigning a packet to an FEC, the ingress edge LSR may look at the IP header of the packet and also some other information such as the interface on which the packet arrived, to determine the appropriate FEC and thus the appropriate label to assign to the incoming data packet.

Labeled packets are forwarded along a label switch path (LSP) that may include one or more other LSRs in the MPLS network. The LSRs of the LSP decide which way to forward an incoming packet based on the packet's incoming label. More particularly, LSRs use label information base (LIB) tables that map incoming labels of incoming packets to outgoing labels of outgoing packets and outgoing interfaces. When an LSR receives an incoming packet, the LSR typically uses its LIB table to map the incoming label of the incoming packet to an outgoing label. The LSR then swaps the incoming label with the mapped outgoing packet label, which tells the next LSR in the LSP how to forward the data packet. The LSR outputs the packet to the next LSR in the LSP out of an interface that is also identified in the LIB. MPLS allows LSRs to make simple forwarding decisions based on the contents of a simple label, rather than making a complex forwarding decision based on IP addresses.

LSPs come in several forms including: point-to-point (P2P) LSPs in which labeled packets are transmitted from one ingress LSR to one egress LSR, and; point-to-multipoint (P2MP) LSPs in which labeled packets are transmitted from one ingress LSR to multiple egress LSRs. P2MP LSPs can be used to transmit multicast data packets from a source on one side of the MPLS network to multiple receivers on the other side of the MPLS network. Branching LSRs in P2MP LSPs replicate packets as needed and forward the original and replicated packets to the next LSRs.

LSPs are provisioned using Label Distribution Protocols (LDPs). LDP lets an LSR distribute labels to its LDP peers. When an LSR assigns a label to an FEC it informs its relevant peers of this label and its meaning, and LDP is used for this purpose. Since a set of labels from an ingress edge LSR to an egress edge LSR in an MPLS network defines an LSP, LDP helps in establishing a LSP by using a set of procedures to distribute the labels among the LSR peers. U.S. patent application Ser. No. 11/267,674 describes an in-band multicast LDP (mLDP) technique that can be used to establish a P2MP LSP through an MPLS network. These P2MP LSPs within a MPLS network can be used to "connect" multicast group receivers on one side of an MPLS network to a source on the other side of the MPLS network, so that multicast packets transmitted by the source can reach the receivers notwithstanding an intervening third-party provider MPLS network.

The invention described in U.S. patent application Ser. No. 11/267,674 works quite well if all LSRs, including core LSRs, are mLDP enabled. However, problems can arise in MPLS networks which contain LSRs which are not mLDP enabled.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
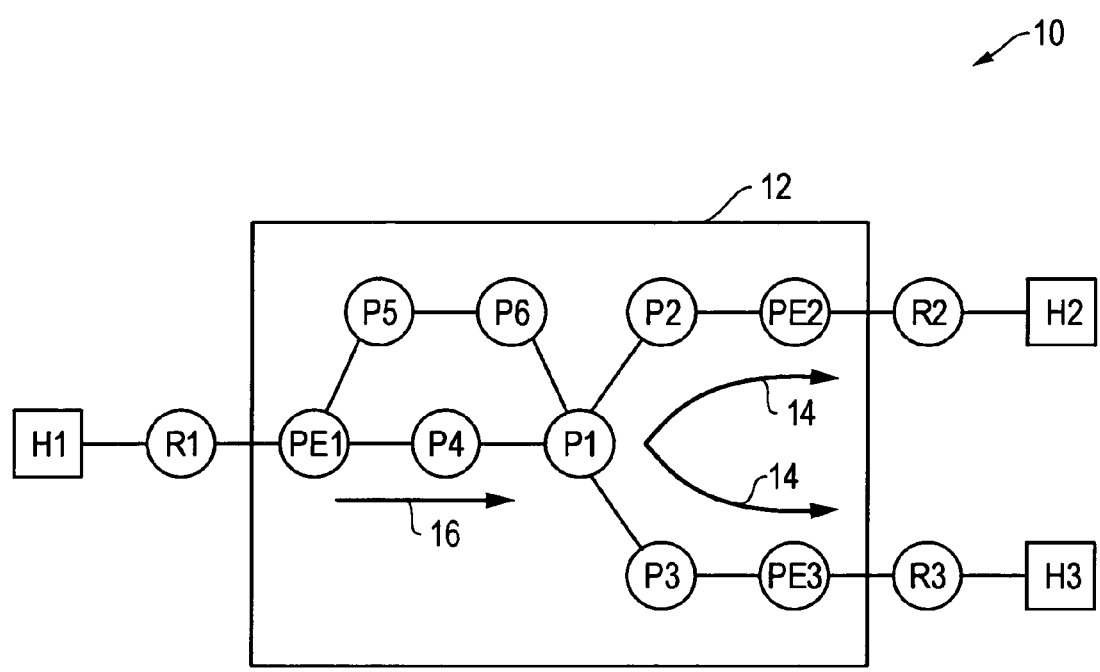
FIG. 1 is a simplified block diagram of a network performing a multicast transmission.

U.S. patent application Ser. No. 11/267,674 describes a method for creating a P2MP LSP within an MPLS enabled network. Each of the LSRs within the MPLS network described in U.S. patent application Ser. No. 11/267,674, are presumed to be mLDP enabled. To illustrate, FIG. 1 is an exemplary network 10 consisting of hosts H1-H3 coupled to PIM enabled routers R1-R3, respectively. FIG. 1 also shows router R1 coupled to routers R2 and R3 via an MPLS network 12. MPLS network 12 includes MPLS enabled edge LRSs PE1-PE3 coupled to MPLS enabled core LSRs P1-P6. In addition to being MPLS enabled, edge LSRs PE1-PE3 are PIM enabled and coupled to routers R1-R3, respectively. For purposes of explanation, it will be temporarily presumed that each of the LSRs within MPLS network 12 is mLDP enabled or capable of operating in accordance with the invention described in U.S. patent application Ser. No. 11/267,674.

Presume host HI is a source that generates multicast data packets destined for receivers of a multicast group identified by multicast IP address G. Further, presume that hosts H2 and H3 seek to join G as receivers. Because each of the LSRs within MPLS network 12 is mLDP enabled, a P2MP LSP can be configured in MPLS network 12 to transmit multicast data packets from source H1 to receivers H2 and H3 once they have successfully joined the multicast group G. The P2MP LSP can include edge LSR PE1 as the ingress point for the multicast data packets, and edge LSRs PE2 and PE3 as the egress points from which multicast data packets exit MLPS network 12 for subsequent transmission to receivers H2 and H3, respectively. Core LSRs P1-P4 can also be included in the P2 MPLSP, with core LSR P1 as the point of data replication in the P2MP LSP. However, if one or more LSRs within the MPLS network 12 is not mLDP enabled, it may be difficult if not impossible to create the P2MP LSP necessary to transmit multicast data packets from source H1 to receivers H2 and H3. For example, presume core LSR P4 is not mLDP enabled in accordance with U.S. patent application Ser. No. 11/267, 674. As such, a P2MP LSP cannot be created transmitting a multicast data packet of interest that includes core LSR P4.

The present invention describes a method of using a P2P LSP to transmit multicast data packets part way through an MPLS network. The P2P LSP can include core LSRs that are not mLDP enabled. The P2P LSP can be used in combination with a P2MP LSP created in accordance with the methods described in U.S. patent application Ser. No. 11/267,674 (or other methods) in order to complete the transmission of multicast data packets all the way through the MPLS network. For example, a P2MP LSP 14 can be created within MPLS network 12 in accordance with U.S. patent application Ser. No. 11/267,674, which consists of core LSRs P1-P3 and edge LSRs PE2 and PE3. P2MP LSP 14 can transmit multicast data packets received from P2P LSP 16 that includes edge LSR PE1 and core LSRs P4 and P1, where core LSR P4 is non-mLDP enabled. In other words, P2P LSP 16 may be used to transmit multicast data packets from source HI to core LSR P1, and P2MP LSP 14 may be used to transmit the multicast data packets received from P2P LSP 16 out of the MPLS network 12 to routers R2 and R3 for subsequent delivery to receivers H2 and H3, respectively. Thus, even though core LSR P4 is non-mLDP enabled, an LSP consisting of a P2P LSP 16 and P2MP LSP 14 can be formed in MPLS network 12 for transmitting multicast data packets to receivers H2 and H3.

One embodiment of the present invention could be implemented as a computer program executing on one or more processors of routers, although those skilled in the art will readily recognize that the equivalent of such software may also be constructed in hardware. If the invention is implemented as a computer program, the program may be stored in a conventional computer readable medium that may include, for example: magnetic storage media such as a magnetic disk (e.g., a floppy disk or a disk drive), or magnetic tape; optical storage media such as an optical disk, optical tape, or machine readable barcode; solid state electronic storage devices such as random access memory (RAM), or read-only memory (ROM); or any other device or medium employed to store computer program instructions.

The present invention will be described with reference to the MPLS network 12 shown in FIG. 1, it being understood that the present invention should not be limited thereto. For the remaining description, it will be presumed that core LSRs P1-P3 and edge LSRs PE1-PE3 are mLDP enabled as described in U.S. patent application Ser. No. 11/267,674. Moreover, it will be presumed for the remaining description that core LSR P4 is not mLDP enabled in accordance with U.S. patent application Ser. No. 11/267,674.

Figure 2:
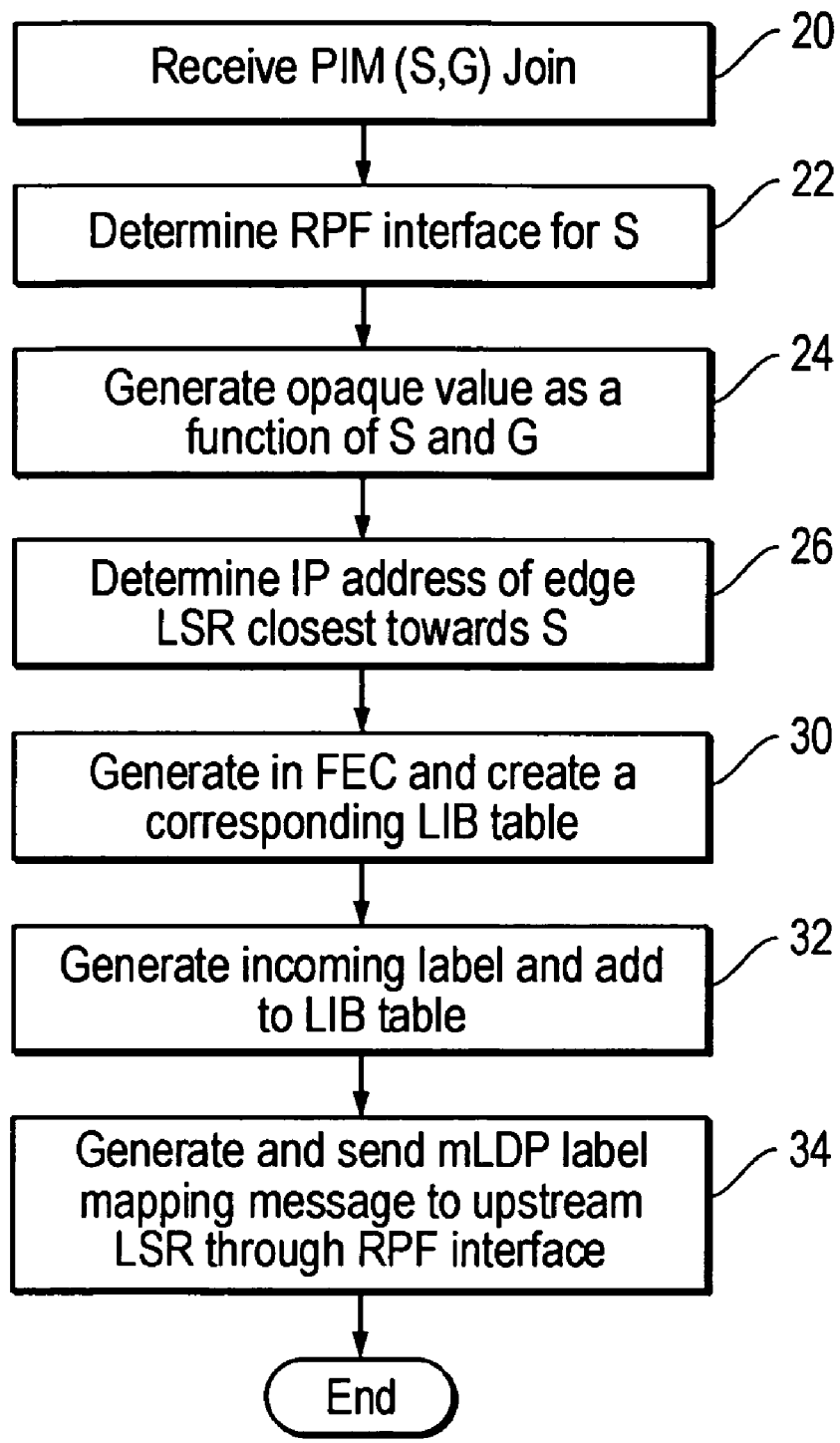
FIG. 2 is a flow chart illustrating relevant aspects of a process performed by an edge LSR in response to receiving a PIM Join message from a downstream PIM enabled router.

U.S. patent application No. 11/267,674 describes relevant aspects performed by mLDP enabled routers during the creation of a P2MP LSP. The creation of P2MP LSP 14 in FIG. 1 is initiated in response to edge LSR PE2 receiving a PIM Join message from PIM enabled router R2. FIG. 2 illustrates relevant aspects of process performed by edge LSR PE2 in response to receiving the PIM Join message, as shown in step 20. It will be presumed that the PIM Join message includes S and G, where S is the IP address of source H1, it being understood that other types of PIM Join messages are contemplated. For purposes of explanation, it will be presumed that edge LSR PE2 does not have a multicast forwarding state for S, G when the PIM Join message is received.

Returning to FIG. 2, edge LSR PE2 is PIM enabled and can use S to identify the RPF interface coupled to the next upstream PIM enabled router that is topologically closest to source H1 in step 22. The RPF interface can be identified using a unicast routing table in one embodiment. Other methods for determining the RPF interface of edge LSR PE2 are contemplated. The RPF interface identified in step 22 is directly coupled to core LSR P2, which is not PIM enabled. As such edge LSR PE2 cannot simply forward the PIM Join it receives to core LSR P2 in accordance with normal PIM procedures. Rather, in accordance with U.S. patent application 11/267,674 edge LSR PE2 begins a process of using in-band signaling to create P2MP LSP 14. This process is initiated with edge LSR PE2 generating an opaque value as a function of S and G of the PIM Join as shown in step 24. The opaque value, in one embodiment, can be generated simply by concatenating S and G. In other embodiments, the opaque value can be generated using a different algorithm. In step 26, edge LSR PE2 identifies the IP address of the ingress edge LSR or the edge LSR (i.e., edge LSR PE1) on the other side of MPLS network 12 that is topologically closest to source H1. The IP address of the ingress edge LSR (i.e., edge LSR PE1) can be determined using S, the IP address of source H1, and a unicast routing table, although other methods are contemplated for determining the IP address of the ingress edge LSR. In step 30, edge LSR PE2 generates a multicast FEC (mFEC) and creates an LIB table. The mFEC can be generated simply by concatenating the opaque value generated in step 24 with the IP address identified in step 24. Other methods of generating the mFEC are contemplated. The mFEC may contain additional information. For example, the mFEC may contain information identifying whether S and G are IPv4 or IPv6 addresses.

In step 32, edge LSR PE2 generates an incoming label that is associated with the mFEC generated in step 30. This label can be added to the LIB table created in step 32. Additionally, the interface of edge LSR PE2 that receives the PIM join message may be added to the LIB table and linked to the incoming label generated in step 32. In one embodiment, whenever edge LSR PE2 receives a labeled packet with the label generated in step 32, edge LSR PE2 will strip off the label and output the resulting packet through the interface linked to the label in the LIB table created in step 32. It is noted that the table may include additional interfaces of edge LSR PE2 through which data packet or replications thereof may be output to other downstream receivers (not shown in FIG. 1) coupled to other PIM enabled routers (not shown in FIG. 1). Finally, edge LSR PE2 generates and sends an mLDP label mapping message to upstream core LSR P2 through the RPF interface identified in step 22, as shown in step 34. The mLDP label mapping message includes the label generated in step 32 and the mFEC generated in step 30.

Figure 3:
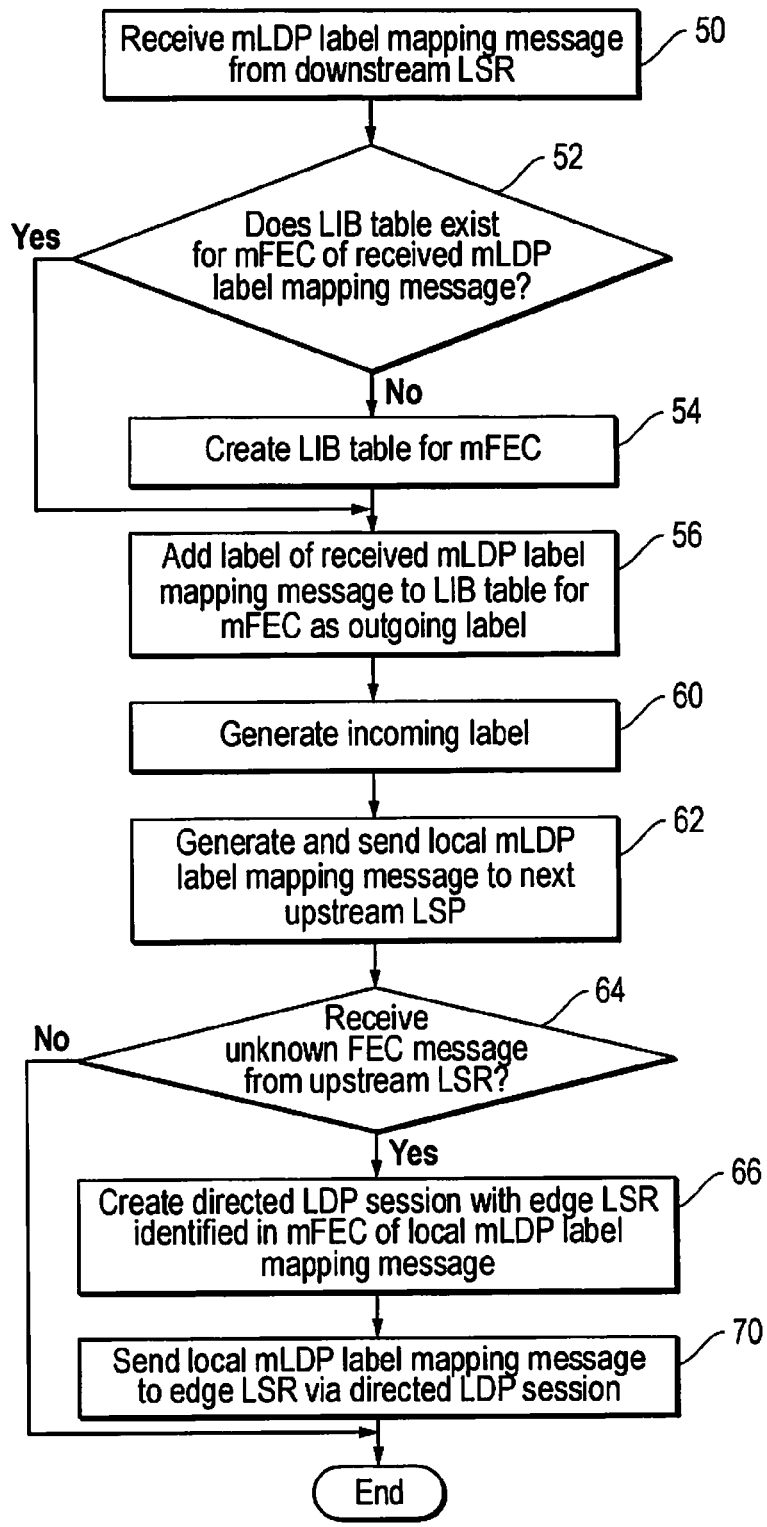
FIG. 3 is a flow chart illustrating relevant aspects of a process performed by an mLDP enabled LSR in response to an mLDP label mapping message.

FIG. 3 illustrates relevant aspects of a process implemented by, for example, core LSRs of MPLS network 12 in response to receiving an mLDP label mapping message for building P2MP LSP 14. For example, the process shown within FIG. 3 can be implemented by core LSR P1 in response to core LSR P1 receiving an mLDP label mapping message from core LSR P2. The mLDP label mapping message received by core LSR P1 was generated and sent by core LSR P2 in response to core LSR P2 receiving the mLDP label mapping message described with reference to FIG. 2. The mLDP label mapping message received by core LSR P1 contains the same mFEC generated in step 30 of FIG. 2. However, the mLDP label mapping message received by core LSR P1 contains a label generated by core LSR P2 that is different than the label generated by edge LSR PE2 in step 32 of FIG. 2.

In response to core LSR P1 receiving the mLDP label mapping message in step 50, core LSR P1 determines whether it has an LIB table for the mFEC of the received mLDP label mapping message in step 52. For purposes of explanation, it will be presumed that core LSR P1 does not have an LIB table for the mFEC. Accordingly, core LSR1 creates an LIB table for mFEC as shown in step 54. In step 56, core LSR P1 adds the label of the received mLDP label mapping message received in step 50 to the LIB table as an outgoing label. Additionally, the interface of core LSR P1 that received the mLDP label mapping message in step 50 is added to the LIB table for the mFEC and linked to the added outgoing label. As an aside, when the process shown in FIG. 3 is implemented in core LSR P2, the label generated in step 32 would be added to the LIB table for the mFEC as the outgoing label.

In step 60, core LSR P1 generates an incoming label. Although not shown within the process of FIG. 3, this incoming label is also added to the LIB table created for the mFEC and linked to the label added in step 56. In one embodiment, whenever core LSR P1 receives a labeled packet with the label generated in step 60, core LSR P1 will swap the label with the outgoing label stored in step 56 and send the packet out of the interface linked to the outgoing label in the LIB table of the mFEC.

In step 62, core LSR P1 generates and sends an mLDP label mapping message to the next LSR toward the edge LSR identified in the mFEC. In this example, core LSR P1 would send the mLDP label mapping message to core LSR P4. However, as noted above, core LSR P4 is not mLDP enabled and cannot implement the process shown in FIG. 3. Because core LSR P4 is not mLDP enabled, core LSR P4 will not recognize the mFEC of mLDP label mapping message it receives from core LSR P1, and core LSR P4 will return an unknown FEC message or other error message to core LSR P1. Steps 64-70 of FIG. 3 describe a method of bypassing a non-mLDP enabled core LSR in order to deliver the mLDP label mapping message to edge LSR identified in the mFEC. Specifically, in step 64 when core LSR P1 receives the unknown FEC message from core LSR P4, core LSR P1 creates a directed LDP session with the edge LSR identified in the mFEC. Thereafter in step 70, core LSR P1 sends the mLDP label mapping message generated in step 62 to edge LSR PE1 via the directed LDP session, and the process then ends. Additionally, core LSR P1 may send its identification (e.g., the IP address for core LSR P1) along with the mLDP label mapping message to edge LSR PE1. In another embodiment, core LSR P1 may know that the next upstream LSR is not mLDP enabled when core LSR P1 receives the mLDP label mapping message from the downstream router in step 50. In this other embodiment, rather then send the mLDP label mapping message that core LSR generates to the next upstream LSR as shown in step 62, core LSR P1 may immediately jump to step 66 and create the directed LDP session with LSR PE1, the edge LSR identified in the mFEC. Thereafter core LSR P1 sends the mLDP label mapping message generated in step 62 to edge LSR PE1 as shown in step 70.

Figure 4:
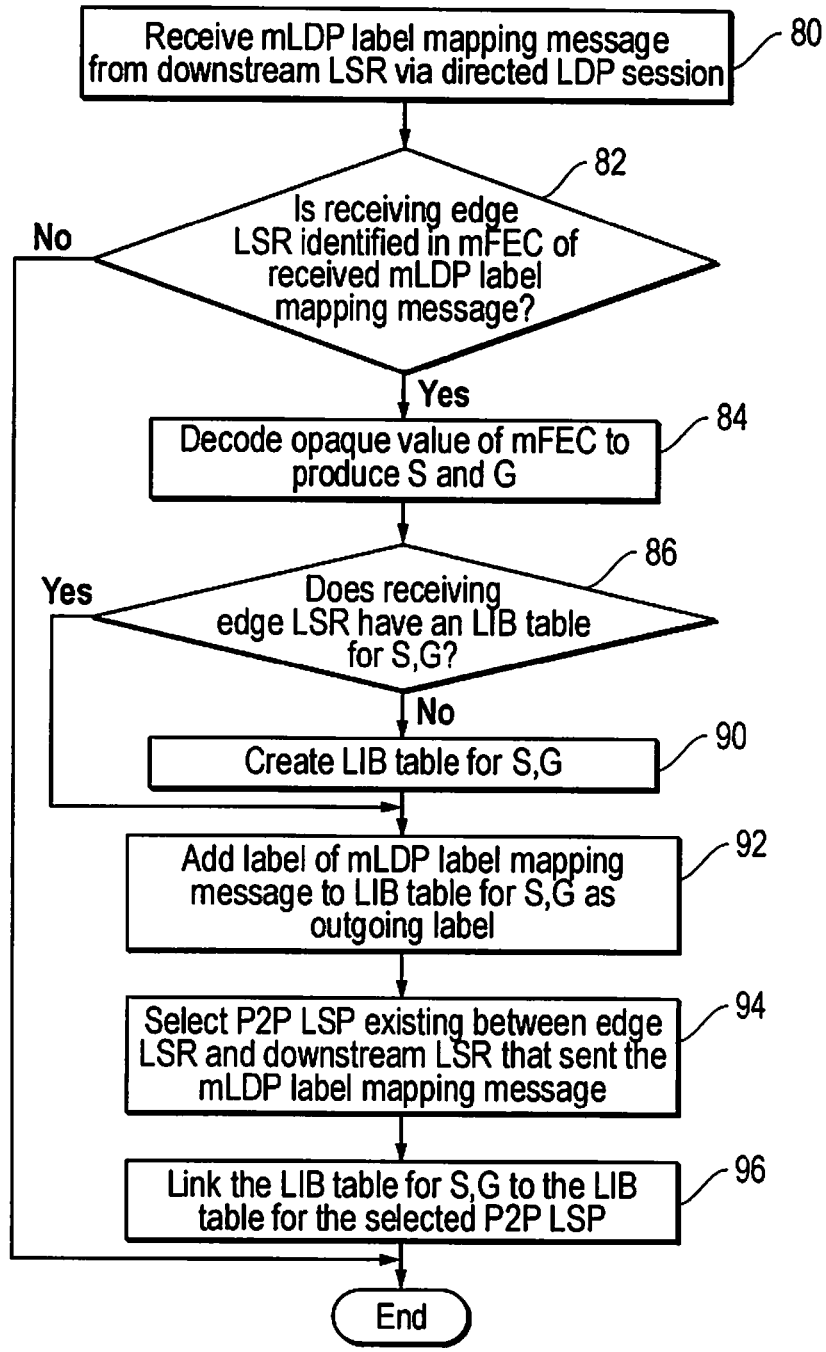
FIG. 4 is a flow chart illustrating relevant aspects of a process performed by an edge LSR in response to receiving an mLDP label mapping message via a directed LDP session with a downstream LSR.

FIG. 4 illustrates relevant aspects of a process implemented by an edge LSR, such as edge LSR PE1, in response to receiving an mLDP label mapping message from a downstream LSR via a directed LDP session. FIG. 4 will be described with reference to edge LSR PE1 receiving the mLDP label mapping message generated and sent by core LSR P1 in FIG. 3. In FIG. 4, the edge LSR (e.g., edge LSR PE1) determines whether it is the ingress edge LSR identified in the mFEC of the mLDP label mapping message it receives in step 80. In other words, edge LSR PE1 determines in step 82 whether its IP address matches the IP address in the mFEC it receives in step 80. If the IP address of the mFEC doesn't match, the mLDP label mapping message received in step 80 is dropped, and the process of FIG. 4 ends. If the IP addresses match, the process proceeds to step 84 where edge LSR PE1 decodes the opaque value of the mFEC to produce S and G. The method of decoding the opaque value in step 84 is the reverse of the method used by edge router PE2 to create the opaque value as a function of S and G.

In step 86, edge LSR PE1 determines whether it has an LIB table associated with S and G. It will be presumed for the purposes of explanation only, that edge LSR PE1 does not have an LIB table associated with S and G when edge LSR PE1 receives the mLDP label mapping message from core LSR P1 in step 80. Accordingly. edge LSR PE1 creates an LIB table for S, G in step 90. and in step 92 edge LSR PE1 adds to the LIB table for S, G, the label contained within the mLDP label mapping message it receives from core LSR P1. No interface of ingress edge LSR PE1 is linked to the label added to the LIB table in step 92. Rather, as shown in step 94, ingress edge LSR PE1 selects an existing P2P LSP (e.g., P2P LSP 16) which couples edge LSR PE1 to the downstream LSR (e.g., core LSR P1) that sent the mLDP label mapping message received in step 80. Thereafter, edge LSR PE1 links the LIB table for S, G to the LIB table existing for the selected P2P LSP, as shown in step 96. As will be described below, the selected P2P LSP can be used to transmit multicast data packets to core LSR P1 for subsequent transmission on the P2MP LSP created using the processes shown within FIGS. 2 and 3. Once the LIB table for S, G is linked to the LIB table for the selected P2P LSP, the process of FIG. 4 ends.

Figure 5:
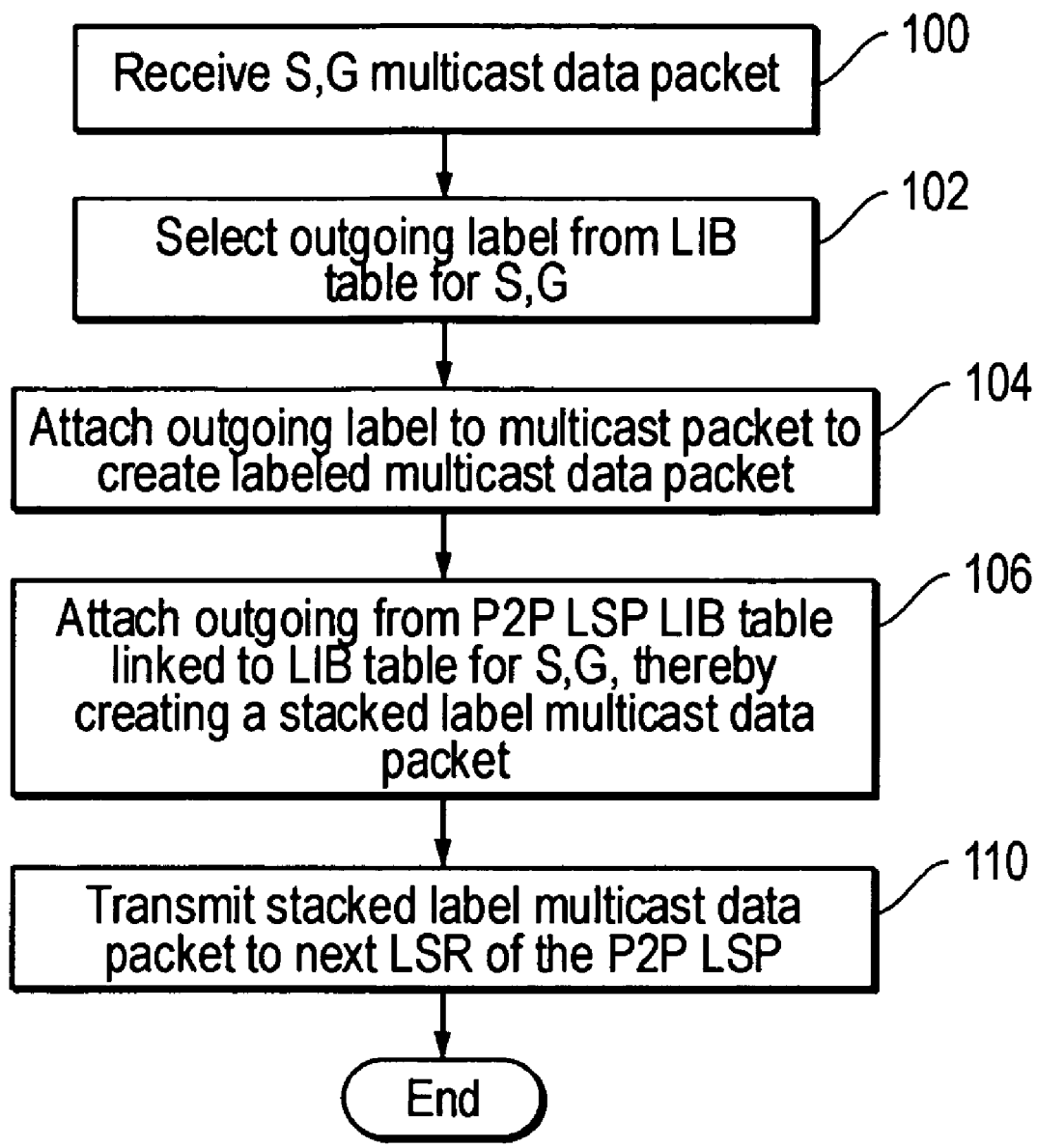
FIG. 5 is a flow chart illustrating relevant aspects of a process performed by an ingress edge LSR in response to receiving multicast data packets.

FIG. 5 illustrates relevant aspects of a process implemented by an ingress edge LSR in response to receiving multicast data packets, after the ingress edge LSR has set up a forwarding state using the process shown in FIG. 4. For example, the process shown in FIG. 5 can be implemented by edge LSR PE1 after the process shown in FIG. 4 has been completed and in response to edge LSR PE1 receiving multicast data packets generated by source H1. The multicast data packets received from source H1 have a header, which in turn includes the S and G addresses In FIG. 5, the process initiates when ingress edge LSR PE1 receives the S, G multicast data packets as shown in step 100. Edge LSR PE1 accesses the header for the multicast data packet to read the S and G addresses contained therein. Edge LSR PE1 then accesses the LIB table associated with S, G and reads the outgoing label (e.g., the label stored in step 92 of FIG. 4) stored therein. Thereafter, edge LSR PE1 assigns or attaches the outgoing label to the multicast data packet it receives in step 100, thereby creating a labeled multicast data packet as shown in step 104. In normal LSP transmission, the labeled multicast data packet would be transmitted to a core LSR. However, since the LIB table for S, G is linked to the LIB table for P2P LSP 16 selected in FIG. 4, edge LSR PE1 attaches the outgoing label from the P2P LSP LIB table that is linked to the LIB table for S, G, thereby creating a stacked label multicast data packet. In the stacked label multicast data packet, the top label is the outgoing P2P LSP label from the LIB table for P2P LSP 16, while the bottom label is the outgoing label from the LIB table for S,G (the label generated by core LSR P1 in step 60 of FIG. 3). Thereafter in step 110, the stacked label multicast data packet is transmitted to the next LSR of the P2P LSP through the interface of edge LSR PE1 identified in the LIB table for P2P LSP 16. In this particular example, the stacked label multicast data packet is transmitted to core LSR P4, the LSR that is non-mLDP enabled.

Figure 6:
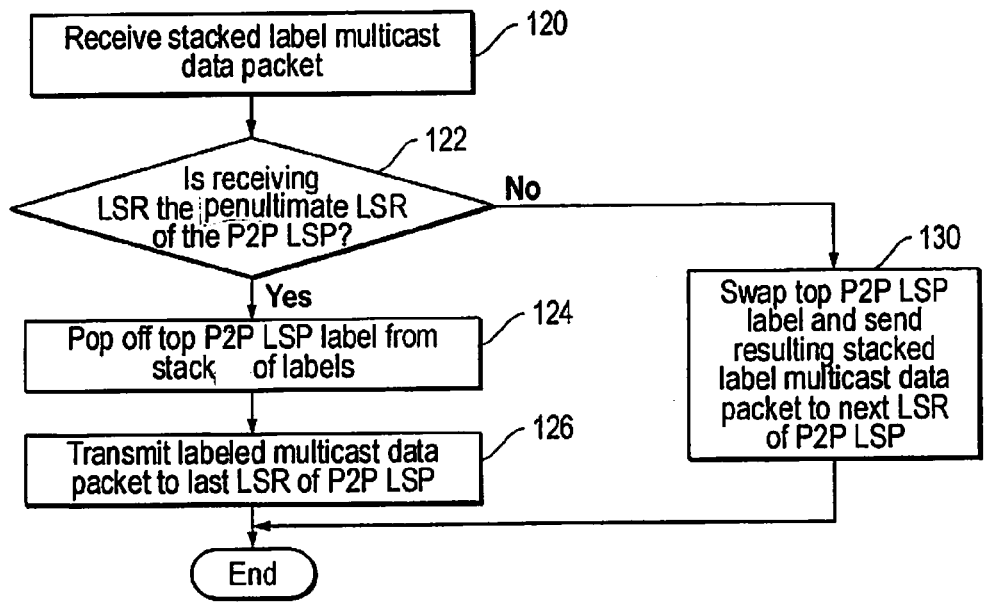
FIG. 6 is a flow chart illustrating relevant aspects of a process performed an LSR of a P2P LSP, which is used to transmit packets to a P2P or P2MP LSP created by mLDP enabled routers in accordance with the process shown in FIGS. 2 and 4.

The LSRs in P2P LSP 16 operate in accordance with normal MPLS protocol when receiving and forwarding labeled packets. FIG. 6 illustrates relevant aspects of a process employed by core LSRs of P2P LSP 16. In step 120, core LSR P4 receives the stacked label multicast data packet generated and sent by ingress edge LSR P1 in accordance with the process shown in FIG. 5. In response, core LSR P4 determines whether it is the penultimate LSR within the P2P LSP. If core LSR P4 was not the penultimate LSR, then in step 130, core LSR P4 would swap the top, incoming P2P LSP label of the packet with an outgoing P2P LSP label in accordance with the LIB table in core LSR P4 and send the resulting stacked label multicast data packet to the next LSR of the P2P LSP. However, core LSR P4 is the penultimate LSR within P2P LSP 16 in the illustrated example. As such, core LSR P4 pops off the top, incoming P2P LSP label from the packet received in step 120. Popping off the top label leaves the labeled data packet created in step 104 by ingress edge LSR PE1. Lastly, core LSR P4 transmits the labeled multicast data packet out of the interface identified in its LIB table to core LSR P1, the last LSR of P2P LSP 16. Core LSR P1 , in turn, swaps the incoming label of the packet transmitted by core LSR P4 with the outgoing label stored in the LIB in step 56 of FIG. 3, and sends the resulting labeled packet out of the interface of P1 that is linked to the outgoing label. It is noted that after H3 joins the multicast group G, core LSR P1 would replicate the multicast data packet it receives from core LSR P4 for subsequent transmission on the P2MP LSP 14 coupled to receiver H3.

Figure 7:
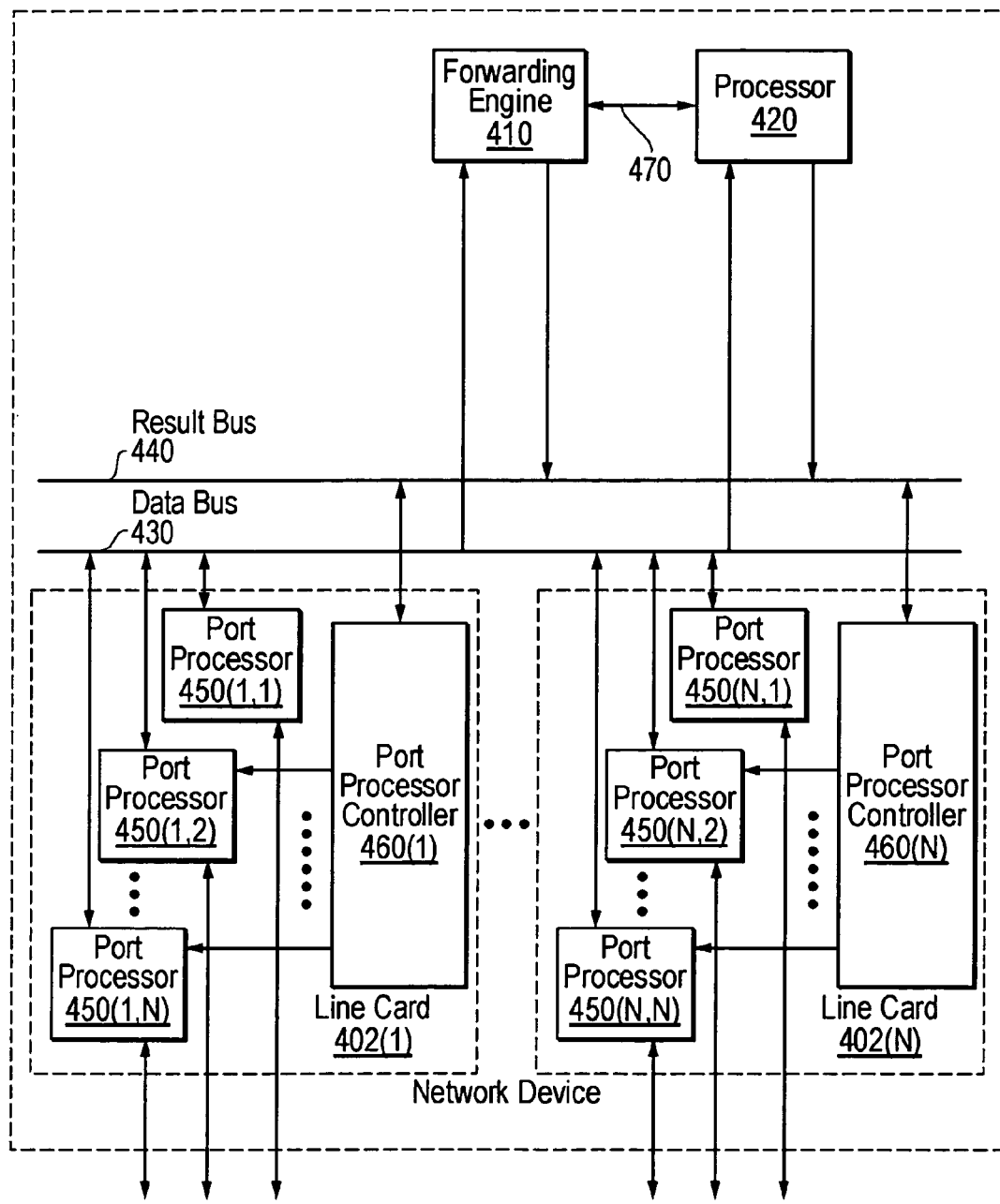
FIG. 7 is a simplified block diagram of a router suitable for implementing one or more aspects of one embodiment of the present invention.

FIG. 7 is a simplified block diagram illustrating an example of a network routing device 400 or router. In this depiction, network routing device 400 includes a number of line cards (line cards 402(1)-(N)) that are communicatively coupled to a forwarding engine 410 and a processor 420 via a data bus 430 and a result bus 440. Line cards 402(1)-(N) include a number of port processors 450(1,1)-(N,N) which are controlled by port processor controllers 460(1)-(N). It will also be noted that forwarding engine 410 and processor 420 are not only coupled to one another via data bus 430 and result bus 440, but are also communicatively coupled to one another by a communications link 470.

The processors 450 and 460 of each line card 402 may be mounted on a single printed circuit board. When a packet is received, the packet is identified and analyzed by a network routing device such as network routing device 400 in the following manner, according to embodiments of the present invention. Upon receipt, a packet (or some or all of its control information) is sent from the one of port processors 450(1, 1)-(N,N) at which the packet was received to one or more of those devices coupled to data bus 430 (e.g., others of port processors 450(1,1)-(N,N), forwarding engine 410 and/or processor 420). Handling of the packet can be determined, for example, by forwarding engine 410. For example, forwarding engine 410 may determine that the packet should be forwarded to one or more of port processors 450(1,1)-(N,N). This can be accomplished by indicating to corresponding one(s) of port processor controllers 460(1)-(N) that the copy of the packet held in the given one(s) of port processors 450(1,1)-(N,N) should be forwarded to the appropriate one of port processors 450(1,1)-(N,N).

In the foregoing process, network security information can be included in a frame sourced by network routing device 400 in a number of ways. For example, forwarding engine 410 can be used to detect the need for the inclusion of network security information in the packet, and processor 420 can be called into service to provide the requisite network security information. This network security information can be included in the packet during the transfer of the packet's contents from one of port processors 450(1,1)-(N,N) to another of port processors 450(1,1)-(N,N), by processor 420 providing the requisite information directly, or via forwarding engine 410, for example. The assembled packet at the receiving one of port processors 450(1,1)-(N,N) can thus be made to contain the requisite network security information.

In addition, or alternatively, once a packet has been identified for processing according to the present invention, forwarding engine 410, processor 420 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a core router receiving a multicast label distribution protocol (LDP) message;
   the core router detecting that a multicast LDP session with an edge router cannot be established;
   the core router creating a directed LDP session with the edge router in response to the detecting; and
   the core router transmitting the multicast LDP message to the edge router via the directed LDP session.

2. The method of claim 1 wherein the multicast LDP message comprises a first value, wherein the first value was generated by a second edge router as a function of a multicast group Internet Protocol (IP) address.

3. The method of claim 2 wherein the first value was generated as a function of a multicast data packet source IP address.

4. The method of claim 3 wherein the multicast LDP message comprises an identity of the edge router.

5. The method of claim 4 wherein the multicast LDP message comprises a label generated by the core router.

6. An apparatus comprising:
   a first circuit configured to send a multicast label distribution protocol (LDP) label mapping message to a non-multicast LDP enabled core router;
   a second circuit configured to receive a first message from the non-multicast LDP enabled core router in response to the first circuit sending the multicast LDP label mapping message to the non-multicast LDP enabled core router; and
   a third circuit configured to send the multicast LDP label mapping message to a first edge router via a directed LDP session in response to the second circuit detecting that a multicast LDP session cannot be established with the edge router, wherein the detecting is based in part on the received first message.

7. The apparatus of claim 6 wherein the multicast LDP label mapping message comprises a first value, wherein the first value is generated by a second edge router as a function of a multicast group Internet Protocol (IP) address.

8. The apparatus of claim 7 wherein the first value is generated as a function of a multicast data packet source IP address.

9. The apparatus of claim 8 wherein the multicast LDP label mapping message comprises an identity of the first edge router.

10. A system comprising:
    first and second multicast label distribution protocol (LDP) enabled edge routers coupled to each other via a multicast LDP enabled core router and a non-multicast LDP enabled core router;
    wherein the first multicast LDP enabled edge router is configured to receive a protocol independent multicast (PIM) Join message;
    wherein the multicast LDP enabled core router is configured to receive a message from the non-multicast LDP enabled core router in response to the multicast LDP enabled core router sending a label mapping message to the non-multicast LDP enabled core router;
    wherein the multicast LDP enabled core router is configured to create a directed LDP session with the second multicast LDP enabled edge router in response to detecting that a multicast LDP session cannot be established with the second multicast LDP enabled edge router, wherein
    the detecting is based in part on the received message; and
    wherein the multicast LDP enabled core router is configured to send the label mapping message to the second multicast LDP enabled edge router via the directed LDP session.

11. The system of claim 10 wherein the label mapping message comprises a first value generated by the first multicast LDP enabled edge router, wherein
    the first value is generated as a function of a multicast group Internet Protocol (IP) address contained in the PIM Join message.

12. The system of claim 11 wherein the first value is generated as a function of a multicast data packet source IP address contained in the PIM Join message.

13. The system of claim 12 wherein the label mapping message comprises an identity of the second multicast LDP enabled edge router.

14. The system of claim 10 wherein the label mapping message comprises a label generated by the multicast LDP enabled core router.

15. The system of claim 10 wherein the multicast LDP enabled core router is configured to send an identity of the multicast LDP enabled core router to the second multicast LDP enabled edge router via the directed LDP session.

16. The method of claim 1 wherein the detecting further comprises the core router receiving a first message comprising an unknown forwarding equivalency class message.

17. The method of claim 1 further comprising
    the core router transmitting an identity of the core router to the edge router via the directed LDP session.

18. The apparatus of claim 6 further comprising;
    a fourth circuit configured to receive a data packet via a point-to-point (P2P) label switched path (LSP);
    a fifth circuit configured to replicate the data packet to produce a replicated data packet; and
    a sixth circuit configured to send the replicated data packet to a multicast LDP enabled edge router via a point-to-point (P2MP) LSP.

19. A method in a multiprotocol label switched (MPLS) network comprising:
    an MPLS enabled core router detecting that a multicast label distribution protocol (LDP) session between the MPLS enabled core router and an MPLS enabled edge router cannot be established because an intervening router is not multicast LDP enabled; and
    the MPLS enabled core router creating a directed LDP session between the MPLS enabled core router and the MPLS enabled edge router if the multicast LDP session cannot be established.

* * * * *